April 3, 1928.
W. G. CUMMING
1,664,970
TIRE INFLATING MECHANISM
Filed Nov. 28, 1924    2 Sheets-Sheet 1
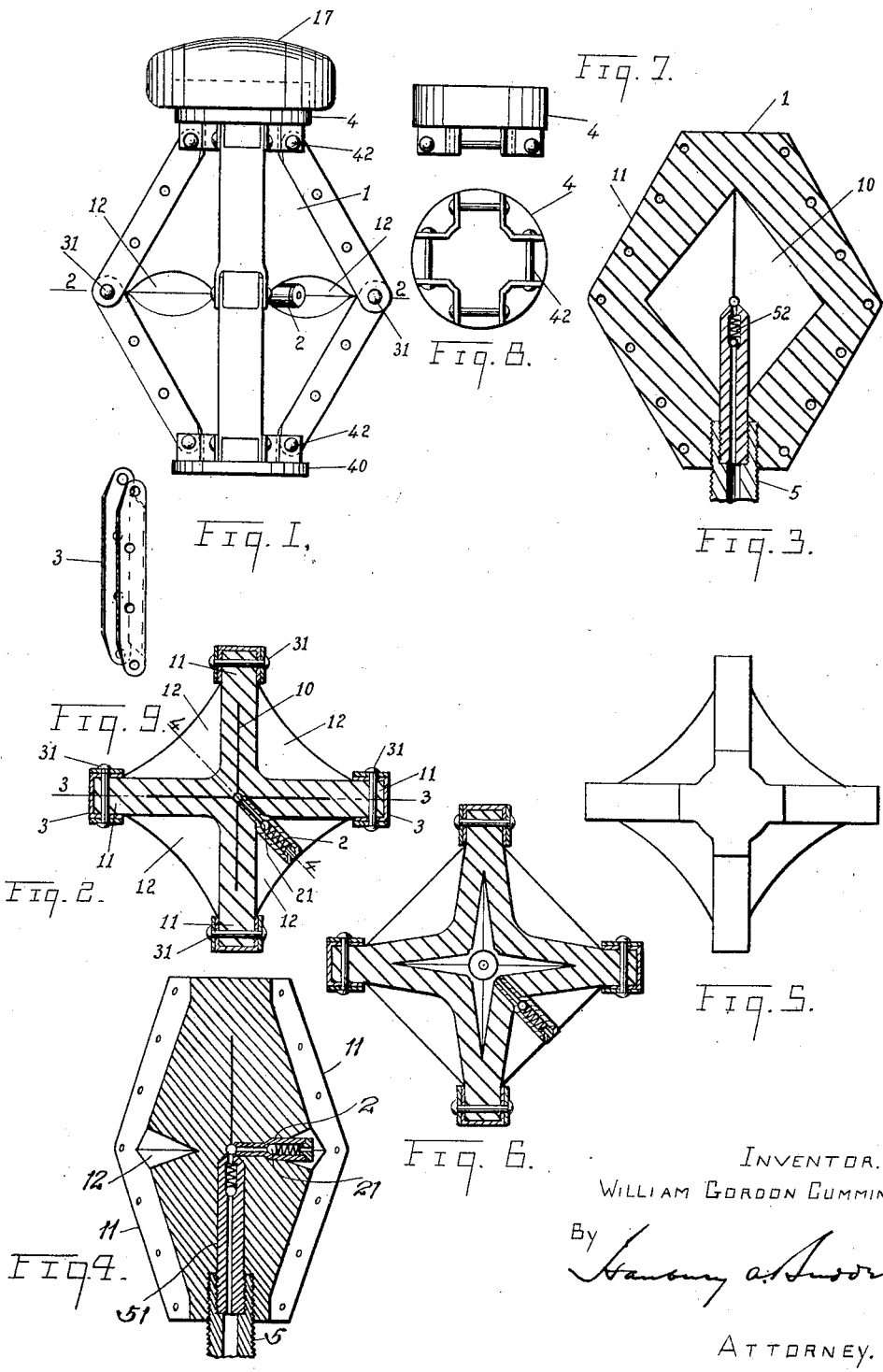
INVENTOR.
WILLIAM GORDON CUMMING.
By
ATTORNEY.

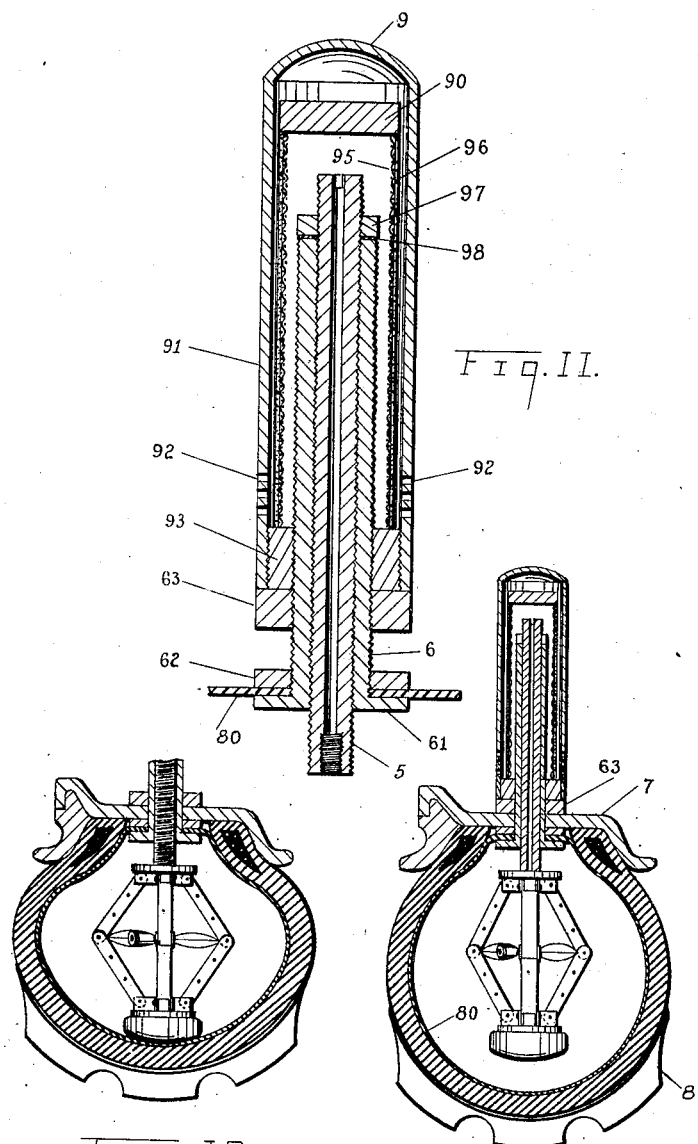

Patented Apr. 3, 1928.

1,664,970

UNITED STATES PATENT OFFICE.

WILLIAM GORDON CUMMING, OF MONTREAL, QUEBEC, CANADA.

TIRE-INFLATING MECHANISM.

Application filed November 28, 1924. Serial No. 752,749.

This invention relates to means for pumping automobile tires and more particularly to provide an automatic pump contained within the tire.

It has for its object to provide a means for maintaining the air pressure in a tire operated by the pressure of the tire tread due to the weight of the vehicle.

It consists of a suction pump within the tire which produces a vacuum when operated by the pressure of the tread of the tire and draws air into the pump, this air is forced out of the pump into the tire tube when the pressure is removed.

By the former art the pump compressed the air during the pressure of the tread and fed the compressed air into the tire tube, or drew air into the pump under normal pressure and forced it from the pump into the tire tube under the compression of the tread.

Whereas in this device the air is sucked into the pump by the compression of the tread and is then forced into the tire when the pump resumes its normal shape on the pressure being removed.

My invention is of simple and cheap construction and provides a reliable means of maintaining a suitable air pressure within a pneumatic tire.

Reference is made to the accompanying drawings in which

Fig. 1 is a side view of the pump.

Fig. 2 is a central longitudinal cross section on the line 2—2 of Fig. 1.

Fig. 3 is a vertical cross section on the line 3—3 of Fig. 2 without the toggles.

Fig. 4 is a verticle cross section on the line 4—4 of Fig. 2.

Fig. 5 is a top view of the rubber portion of the pump.

Fig. 6 is a horizontal cross section similar to that of Fig. 2, but showing the effect of compression and the expansion of the rubber resulting therefrom.

Fig. 7 is a side view of the toggle bearing plate.

Fig. 8 is a bottom view of the upper bearing plate.

Fig. 9 is a perspective view of a toggle.

Fig. 10 shows the device in position.

Fig. 11 is an enlarged view of a form of inlet tube and air filter.

Fig. 12 shows the device in operation with the tire tread under compression.

The pump consists of a rubber body portion 1, having slits 10, radiating from its vertical axis.

In the form shown the body portion is octagonal with upper and lower extending edges 11, and four triangular shaped slits radiating towards these edges.

The horizontal edges are cut away and wedge shaped cavities 12, formed between the upper and lower faces of the octagon.

A series of toggles $x^3$, channel shaped as shown in Fig. 9 are riveted over the edges 11, each pair being pivoted together by pins 31, which pass through the rubber edges 11.

Suitable upper and lower bearing plates 4, and 40, provide flanged bearings to which the toggles 3, are pivoted by pins 42.

The upper bearing plate supports the cap or button 17, to which it is secured.

The lower plate 40, is centrally bored to receive the inlet tube 5.

This tube 5, is threaded and carries on its end the inlet tip 51, which is preferably made of semi-rigid material. A ball valve 52, controls the opening of the tip 51.

An outlet tube 2, leads from the opening of the tip 51, of the inlet tube 5, and extends outwardly into one of the cavities 12.

A ball valve 21, in the tube 2, controls the outlet.

The inlet tube 5, is screwed into the stem tube 6. The latter tube 6, has an end flange 61, and is threaded outwardly. A lock nut 62, rips the inner tube 80, of the tire.

The stem tube 6, passes through the rim 7, to which it is secured by a lock nut 63, and then enters the filter cap 9.

The filter cap 9, is composed of two parts, an outer cap 91, with perforations 92, and threaded to screw on the lower ring 93, of the inner cap 90, and an inner cap 90, with a wire mesh or perforated wall 95, and a lower ring 93, adapted to screw on the stem tube 6.

Over the inner cap wall 95, is a filter coat 96, of suitable material such as soft leather or other dust and moisture excluding medium. A nut 97, and washer 98, on the inlet tube 5, will seal the threading on the stem tube 6, from leakage.

When the tire 8, is fully inflated the button 17, of the pump is some distance from the adjacent inner tube 80, as shown in Fig. 10, and the pump does not function.

Where however the tire partially collapses as shown in Fig. 12 the tread of the tire presses the button 17, upwards and operates the pump.

In Fig. 10 the lower plate 40, is shown out of contact with the flange 61, of the stem 6. This is to show the adjustability of the pump. In actual operation this interval would be filled in by a nut to provide a substantial support for the inlet tube and the lower bearing plate.

The operation of this device is as follows:—

When pressure is applied to the button 17, the toggles 3, draw outwards the central portion of the rubber body 1, and form a space as shown in Fig. 6. Air is sucked into this space through the inlet tube 5, and valve 52.

Upon the pressure on the button being removed the rubber body resumes its normal form and the walls of the slits come together forcing the air out through the outlet tube 2, and valve 21, into the interior of the inflated tire and thereby increases the pressure therein.

By means of adjusting the height of the button so that it will only contact with the inner surface of the tire when the air pressure therein is below the required normal pressure, the pump will only function when necessary to raise the air pressure. The tire pressure is thereby automatically maintained at the required normal for efficient service.

Furthermore in the case of leaks of a slight nature or of slow effect the pump will function sufficiently to meet a considerable loss and will avoid the necessity of immediate repairs or change of tire.

The above detail form as described and shown in the drawings is only given to disclose one method of carrying out my invention and I do not in any way limit its scope to this form.

The broad principle of producing a vacuum within a tire by means of the depression of the tire tread, supplying air to fill the vacuum and forcing that air out of the pump into the tire, can be carried out by means differing in design but with equivalent functions.

What I claim is:—

1. In a device of the class specified the combination of a wheel rim and a pneumatic tire thereon with a suction pump within the tire comprising a rubber body having slits radiating from an axis radial to the wheel, a valved air inlet tube leading to the center of the rubber body, an air filter thereto beyond the rim and a valved outlet tube leading from the center of the rubber body to the inside of the tire.

2. In a device of the class specified the combination of a wheel rim and a pneumatic tire thereon, with a suction pump within the tire comprising a rubber body having slits radiating from an axis radial to the wheel, edges extending outwardly beyond the slits, channeled toggles riveted on the edges, journalled in pairs and pivoted to top and bottom bearing plates, a resilient button secured on the top plate, a valved air inlet tube leading through the rim and bottom plate to the center of the rubber body, and a valved outlet tube therefrom to the inside of the tire.

3. In a device of the class specified the combination of a wheel rim and a pneumatic tire thereon, with a suction pump within the tire comprising a rubber body having slits radiating from an axis radial to the wheel, edges extending outwardly beyond the slits, channeled toggles secured on the edges, journalled in pairs and pivoted to top and bottom bearing plates, a resilient button secured over the top plate, a valved inlet tube leading through the rim and bottom plate to center of rubber body, an air filter to the inlet tube, and a valved outlet tube from the center of rubber body to the inside of the tire.

4. In a device of the class specified the combination of a wheel rim and a pneumatic tire thereon, with a suction pump within the tire, means to adjust the position of the pump within the tire, and an air inlet with inlet valve to the pump and an outlet with outlet valve from the pump to the interior of the tire.

5. In an automatic tire inflater the combination of a suction pump having valved inlet and outlet tubes with means to adjust the pump in position within the tire.

WILLIAM GORDON CUMMING.